United States Patent Office 3,354,793
Patented Nov. 28, 1967

3,354,793
PISTON FOR INTERNAL COMBUSTION ENGINES
Alfred Meier, Nellingen uber Esslingen, Eberhard Kohl, Stuttgart, and Eberhard Rossmann, Schmiden, Germany, assignors to Mahle Komm.-Ges., Stuttgart-Bad Cannstatt, Germany
Filed Oct. 4, 1965, Ser. No. 492,428
Claims priority, application Germany, Nov. 26, 1964, M 63,267
1 Claim. (Cl. 92—231)

ABSTRACT OF THE DISCLOSURE

A piston head having a member inserted therein for forming a hollow chamber has the seams between the member and head welded by a charged particle beam which does not penetrate into the chamber. Joint areas adjacent the seams are welded by heat conducted from said beam.

---

Figure 1:
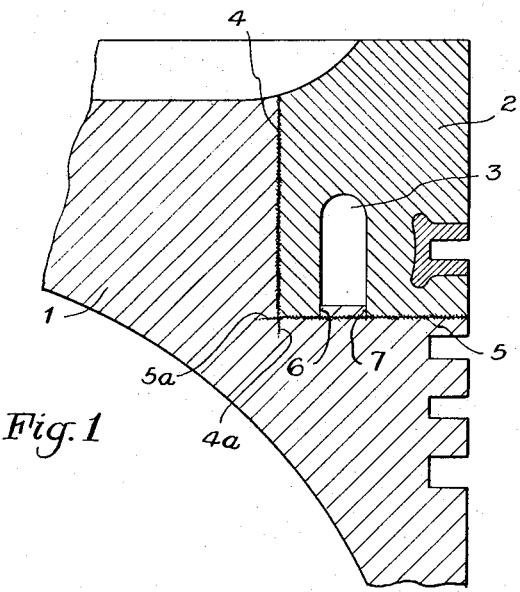

This invention relates to a piston for internal combustion engines and in particular relates to a piston having a piston head with a reduced area in the piston ring zone, a collar seated in said zone, and a hollow chamber between the piston head and the collar which is used, for example, for the passage of cooling oil.

In the production of such a piston, it is known to secure the collar to the piston head by welding a V-shaped seam between the piston head and the collar. Such is not completely satisfactory for making light metal pistons because the V-shaped welding seams may only be relatively shallow and because it is difficult to produce a uniform quality of seam from piston to piston and to detect any faulty seams. Furthermore, stresses are created by the uneven heating caused by the welding which reduces the strength of the weld seam and may be the cause for the occurrence of cracks.

As disclosed in the patent to Steigerwald, U.S. Patent No. 2,987,610, such disadvantages can be largely avoided by using an electrically charged particle beam for the welding. The intensity of this beam can be selected so that it completely penetrates the material being welded. As stated in the aforesaid patent, it can be assured that the welded parts are connected together across the entire depth of the seam. Such would be expected to be especially advantageous in the making of pistons as described above.

However, the advantage of such expectation does not exist. When using the charged particle beam welding, it has been found that the beam penetrates into the hollow chamber between the piston head and collar and carries along with it particles of material which are deposited in the chamber, and which later can enter the oil circulating system, and further that the portion of the welding seam immediately adjacent the hollow chamber can become more or less porous. The pores and faults will produce a groove effect and stresses which encourage the formation of cracks. If the intensity of the charged particle beam is made so small that the beam does not penetrate the entire seam, then no material particles will reach the hollow chamber but the unwelded portion of the seam adjacent the hollow chamber will even more form an opportunity and starting point for cracks which will branch out from there. It is not feasible to select a beam intensity so that the beam will penetrate exactly up to the limiting surface because of the impossibility of exact adjustment of the beam.

The object of this invention is to produce a means for avoiding the above-stated difficulties. In this invention, an insert is placed in the piston head to form a hollow chamber in the piston head. The seams between the insert member and the piston head are welded together by a charged particle beam which extends inwardly from the outside surface of the piston and seams between contacting interior surfaces between the piston head and insert member and which are not viewable from the outside of the piston are short as compared to the seam extending from the outside surface of the piston.

In this invention, the actual depth of penetration of the charged particle beam can be tolerated within the required limits without detriment to the quality of the weld because the beam penetrates through the seam from the outside of the piston into the body of the piston head. Because of the short distance of this seam from the hollow chamber, the adjoining contacting interior surfaces between the piston head and insert member are also welded together by heat conducted from the beam. Grooves are not formed from which stress cracks could start and neither pores nor other welding flaws are produced at any place.

Figures 2, 3:
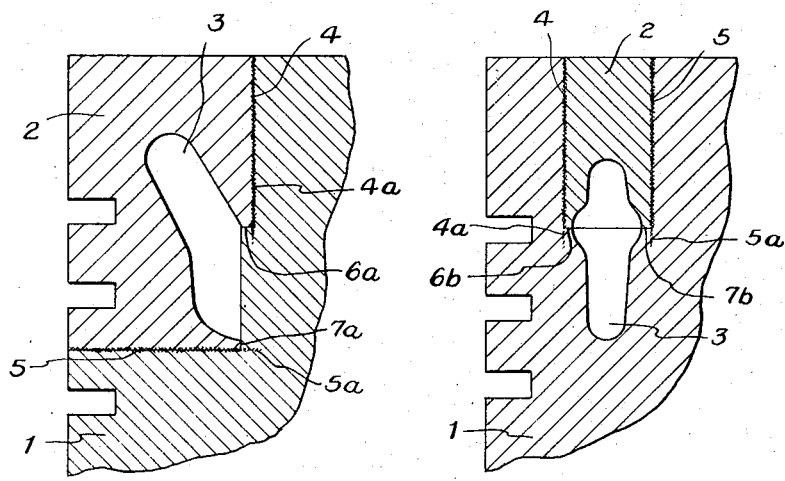

The means by which the objects of the invention are obtained are described more fully with reference to the accompanying drawings in which:

FIGURE 1 is a cross-sectional view through a portion of a piston showing the weld of this invention; and FIGURES 2 and 3 are similar views, respectively, of modified forms of the invention.

As shown in FIGURE 1, the piston head 1 has a reduced area in which a collar or insert member 2 is formed, said collar having a groove therein to form a hollow chamber 3 in the piston head. The seam 4 extending from the outer surface of the piston head is welded by a charged particle beam which penetrates through the seam and into an extended portion 4a in the body of the piston. Similarly, the weld 5 extends through the seam into a portion 5a in the body of the piston. The short seams 6 and 7 between the inserted member and the piston head in the interior of the member and adjacent the chamber 3 are welded together by heat conducted from the weld 5 and thus are welded at the same time as the weld 5 is formed.

In the modification of FIGURE 2, the seams 4 and 5 are similar to those of FIGURE 1. Seam 6a is formed by an edge portion of the insert 2 resting on a ledge in the piston head, while seam 7a is formed by another thin-wall portion of the inserted member bearing against the piston head. These two short seams are also welded together by heat conducted from the welds 4 and 5.

In the modification of FIGURE 3, the insert member 2 has thin wall portions resting upon the ledges in the piston head so that short seams 6b and 7b are formed. The insert member 2 is an annular member. As in the previous figures, seams 6b and 7b are welded at the time the seams 4 and 5 are welded and by the heat conducted from such welds.

In each of the forms of the invention, the short seams 6 and 7 extend at an angle such as a right angle to the relatively long seams 4 and 5.

Having now described the means by which the objects of the invention are obtained, we claim:

In an internal combustion engine piston having a piston head with a member inserted therein to form a hollow chamber in said head, and a charged particle beam weld in the seams between said head and said member, the improvement in which the beam welds extend from the outer surface of the piston head through the seams and into the body of said head without entering said chamber, the adjoining contacting interior surfaces between said head and said member being welded by the heat conducted to said interior surfaces from said beam, and said member having thin wall portions extending at an angle to said beam weld for forming said adjoining contacting interior surfaces.

(References on following page)

References Cited

UNITED STATES PATENTS

| | | | |
|---|---|---|---|
| 2,198,689 | 4/1940 | Wills | 29—156.5 X |
| 2,720,193 | 10/1955 | Maybach | 92—186 X |
| 2,772,933 | 12/1956 | Nichols | 92—231 X |
| 2,882,106 | 4/1959 | Meurer | 92—231 X |
| 2,987,610 | 6/1961 | Steigerwald | 219—121 X |
| 3,075,817 | 1/1963 | Mayes | 29—156.5 X |
| 3,190,273 | 6/1965 | Bachle et al. | 92—231 X |
| 3,221,718 | 12/1965 | Isley | 123—41.35 X |
| 3,221,722 | 12/1965 | Bachle | 123—41.35 |
| 3,258,576 | 6/1966 | Schleich | 219—121 X |

FOREIGN PATENTS

| | | |
|---|---|---|
| 880,033 | 12/1942 | France. |
| 1,230,754 | 6/1959 | France. |
| 1,301,299 | 7/1962 | France. |
| 733,442 | 3/1943 | Germany. |
| 1,103,698 | 3/1961 | Germany. |
| 371,663 | 10/1963 | Switzerland. |

OTHER REFERENCES

"Electron Beam Welding," Welding Engineer, February 1962.

MARTIN P. SCHWADRON, *Primary Examiner.*

G. N. BAUM, *Assistant Examiner.*